United States Patent [19]

Densow

[11] 4,270,642
[45] Jun. 2, 1981

[54] CASTELLATED SPOOL FOR ELECTROMAGNETIC BAND CLUTCH

[75] Inventor: Ulrich O. Densow, Chatham, Canada

[73] Assignee: Canadian Fram Limited, Chatham, Canada

[21] Appl. No.: 1,555

[22] Filed: Jan. 8, 1979

[51] Int. Cl.³ .............................................. F16D 27/02
[52] U.S. Cl. .................................. 192/84 T; 192/80; 192/107 T
[58] Field of Search ................... 192/84 T, 80, 107 T, 192/84 A, 84 B, 84 C; 310/192, 261, 100; 335/296

[56] References Cited

U.S. PATENT DOCUMENTS

| | | | |
|---|---|---|---|
| 865,138 | 9/1907 | Warner | 192/84 T X |
| 1,886,692 | 11/1932 | Kapitza et al. | 192/84 T X |
| 2,052,846 | 9/1936 | Ryba | 192/84 T X |
| 2,519,449 | 8/1950 | Findley | 192/84 B |
| 2,580,869 | 1/1952 | Winther | 192/84 A |
| 2,703,378 | 3/1955 | Harter | 192/84 C X |
| 2,795,715 | 6/1957 | Gilchrist | 310/261 |
| 3,129,798 | 4/1964 | Rabinow | 192/84 T |
| 3,491,866 | 1/1970 | Birdsall | 192/84 T |

Primary Examiner—Rodney H. Bonck
Attorney, Agent, or Firm—Ken C. Decker; William N. Antonis

[57] ABSTRACT

An electromagnetic clutch for a vehicle engine cooling fan includes a driving member mounted for rotation by the vehicle engine and a driven member rotatably mounted on the driving member. The driven member carries the engine cooling fan. One end of a band is connected to the driven member, and wraps circumferentially around the driving member in the direction of the rotation of the latter. An electromagnetic coil comprising windings wound circumferentially around the driving member and rotatable therewith exert an electromagnetic force on the band when current is transmitted to the coil, drawing the band into engagement with the outer circumferential surface of the driving member, to thereby engage the clutch and cause the engine cooling fan to be rotated with the driving member. The radial outer edge of the spool, which is engaged by the band when the clutch is engaged, is provided with alternating castellations or projections which cooperate to define a gap having segments extending obliquely with respect to the edges of the spool. Accordingly, the contact area is distributed across the band instead of being concentrated along the edges of the band, thereby substantially decreasing wear on the band and thereby increasing its useful life.

7 Claims, 4 Drawing Figures

U.S. Patent  Jun. 2, 1981  4,270,642
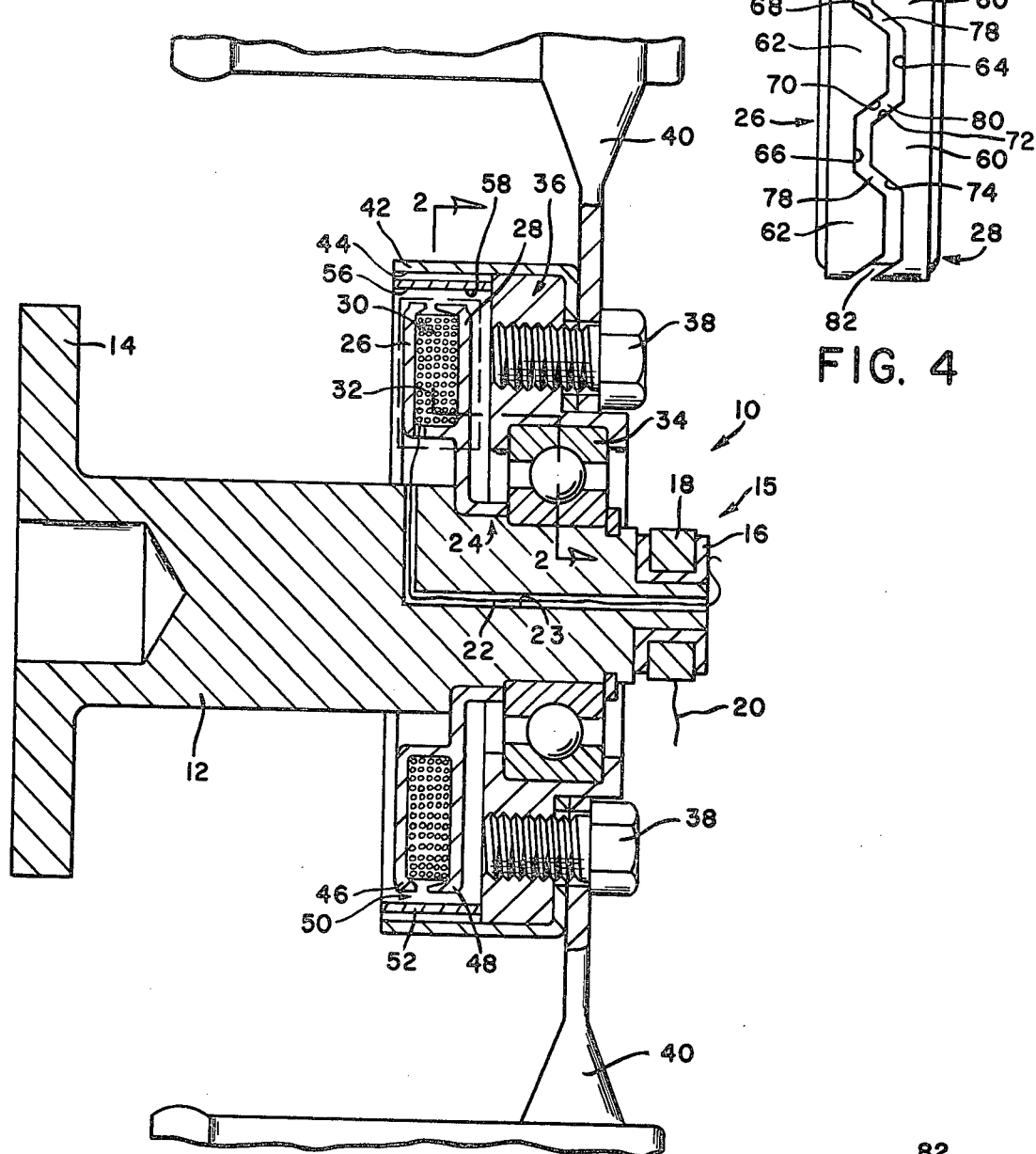
FIG. 1
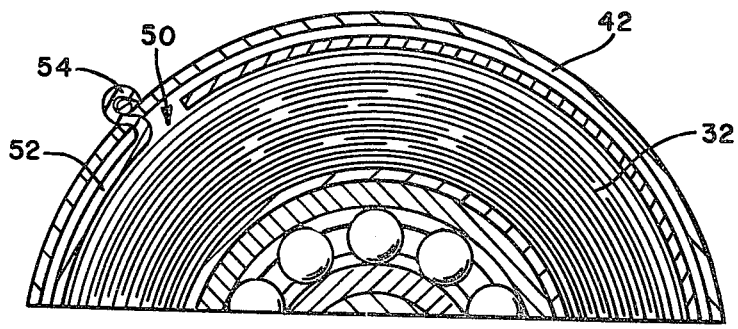
FIG. 2
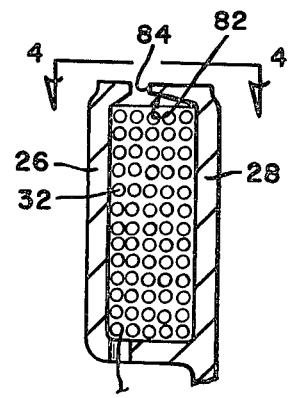
FIG. 3
FIG. 4

CASTELLATED SPOOL FOR ELECTROMAGNETIC BAND CLUTCH

BACKGROUND OF THE INVENTION

This invention relates to a castellated spool design for an electromagnetic band clutch.

Reference is made to U.S. Patent Application Ser. No. 900,829, filed Apr. 28, 1978, owned by the assignee of the present invention, which discloses an electromagnetic band clutch in which a band provides a driving connection between the driving and driven members. Although the clutch disclosed in this application works quite well, it has been discovered that the clutch will last much longer if the contact area between the band and the driven member is distributed over a larger area. This is because in the above-identified application, the contact area is only along the edges of the band, causing them to wear more rapidly than the central portion of the band.

SUMMARY OF THE INVENTION

Accordingly, the present invention provides an electromagnetic band clutch having a spool with a castellated outer edge that is adapted to be engaged by the band. In this way, the contact area between the spool and the band is increased substantially over the design disclosed in the aforementioned application, and the contact area is no longer concentrated along the edges of the band. Furthermore, the castellated design, due to the higher contact area and because each of the castellations has a tapered tip resulting in higher flux saturation, will increase the holding force between the band and the spool. Assuming the same overall spool dimensions and same induction, the castellated design provides the higher holding force due to higher permeance, because of the larger contact area, and because stray flux lines are concentrated by tapered tips of the castellations.

Therefore, an important object of my invention is to provide a novel spool configuration for an electromagnetic band clutch which will reduce the wear between the band and the spool.

Another important object of my invention is to increase the holding force between the band and the spool while maintaining substantially constant overall spool dimensions, as compared to prior art electromagnetic band clutch devices.

Another important object of my invention is to reduce the stray flux lines between the pole gaps of the clutch by assuring that the flux enters the band through the pole gap.

DESCRIPTION OF THE DRAWINGS

FIG. 1 is an axial cross-sectional view of a clutch and fan assembly made pursuant to the teachings of my present invention;

FIG. 2 is a fragmentary, cross-sectional view taken substantially along lines 2—2 of FIG. 1;

FIG. 3 is an enlarged view of the circumscribed portion of FIG. 1; and

FIG. 4 is a view taken substantially along lines 4—4 of FIG. 3.

DETAILED DESCRIPTION

Referring now to the drawing, a clutch and fan assembly generally indicated by the numeral 10 includes a driving member 12 which terminates in a flange 14 for connection with the vehicle engine (not shown), so that the driving member 12 is rotated by operation of the engine. The other end of the driving member 12 carries a slip ring assembly generally indicated by the numeral 15. The slip ring assembly includes a member 16 which is fixed for rotation with the driving member 12 and a slip member 18 which is mounted so that the member 16 can rotate relative to the member 18. Connecting wires 20, 22 extend from the members 18 and 16 respectively, so that an electrical connection is provided between the connecting wires 20 and 22 by the members 16 and 18 of the slip ring assembly 15. The connecting wire 20 is connected to appropriate vehicle engine temperature and/or air conditioning pressure sensors of a type well known to those skilled in the art. Since these sensors are conventional, they will not be described in detail herein. The connecting wire 22 is carried within passage 23 in the driven member 12.

The driving member 12 also carries a circumferentially extending bracket 24 which is made of magnetic material and which is mounted for rotation with the driving member 12. The bracket 24 includes a pair of axially spaced, circumferentially extending pole piece portions 26, 28 which circumscribe the driving member 12 and which cooperates with one another to define a cavity 30 therebetween. The pole piece portions 26, 28 define a spool housing an electromagnetic coil comprising windings 32 disposed in the cavity 30, which are wrapped circumferentially around the driving member 12. The windings 32 are connected with the connecting wire 22, so that when an electrical signal is transmitted through the connecting wire 20, electrical current will be transmitted to the coil 32 by the connecting wire 20, the slip ring 15, and the connecting wire 22.

A bearing 34 mounted on the driving member 12 between the bracket 24 and the slip ring assembly 15, mounts a driven member 36 for rotation relative to the driving member 12. Bolts 38 attach fan blades 40 to the driven member 36, so that the fan blades 46 are rotated with the driven member 36. Of course, it will be understood by those skilled in the art that additional fan blades 40 are spaced circumferentially around the periphery of the driven member 36 in a manner well known to those skilled in the art. The driven member 36 further includes an axially extending portion 42 which projects from the driven member 36 and which circumscribes the pole piece portions 26 and 28 of the bracket 24. The inner circumferential surface 44 of the portion 42 cooperates with the outer circumferential edges 46, 48 of the pole piece portions 26 and 28 to define a gap 50 therebetween. A circumferentially extending band 52 is disposed in the gap 50. One end of the band 52 is connected to the axially extending portion 42 of driven member 36 by connecting mechanism 54. The band 50 extends from the portion 54 in a direction such that the band wraps around the driving member 12 in the direction in which the latter rotates. Of course, driving member 12 is able to rotate in a single direction only, since it is operated directly by the vehicle engine.

Referring now to FIGS. 3 and 4, the outer circumferential edges 46, 48 of the pole piece portions 26, 28 carry axially extending projections or castellations 60, 62. Each of the projections 60, 62 alternates with a corresponding projection projecting from the opposite pole piece portions, as most clearly illustrated in FIG. 3. Each of the portions 60 define a gap 64 therebetween and each of the projections or castellations 62 define a gap 66 therebetween. The gaps 64, 66 receive a corresponding projection 60 or 62 extending from the opposite circumferential edge 46 or 48. Each of the projections 60, 62 are tapered in the axial direction to define tapered sides 68, 70 on the projections 62 and tapered sides 72, 74 on the projections 60. Accordingly, it will be noted that the projections cooperate with one another to define a segmented gap therebetween which is generally indicated by the numeral 76. The segmented gap 76 includes segments 78 which extend obliquely with respect to the pole piece portions 26, 28 and other segments 80, which also extend obliquely between the pole piece portions, and which form an acute angle with respect to the segments 78. As most clearly illustrated in FIG. 4, the projections 60, 62 are tapered as at 82, so that the radially thickest portion of the projections or castellations is at their juncture with their corresponding circumferentially extending edge 46 or 48. The projections or castellations 60, 62 taper to a tip as at 84.

The band is made from magnetic material, as are pole piece portions 26, 28 so that a magnetic circuit is defined consisting of pole piece portions 26, 28, the band 50, the outer edges 46, 48 and the projections 60, 62. The outer edges 46, 48 and the projecting portions or castellations 60, 62 are adapted to frictionally engage with the band 52 when the clutch is engaged. Accordingly, it will be noted that the band 52 bridges the gap 76 when the clutch is engaged, to thereby complete the magnetic circuit defined by the pole piece portions 26, 28, which include the projecting portions or castellations 60, 62. It will be noted because of the obliquely extending segments 74, 78 of the gap 76, that the contact area between the band 52 and the spool is spread over a substantial area of the band, thereby reducing wear of the band at any one particular point. This, of course, increases the life of the clutch. Furthermore, the increased contact area, and the tapered tip 84, increase the holding force for a given spool configuration and permeance. This is because the tapered tip 84 concentrates the flux so that a higher percentage of the flux will pass through the band 52 when the band 52 is engaged with the spool. Furthermore, the increased contact area defined by the projections 60, 62 reduces the air gap between the pole pieces, thereby also increasing the holding power of the magnetic field.

MODE OF OPERATION

The various components of the clutch mechanism 10 are illustrated in the drawings in the position they assume when the clutch is disengaged. In this condition, the driven member 12, of course, will be rotated by the vehicle engine, but the driven member 36 will not be driven thereby, because there is no driving connection between the driving member 12 and the driven member 36 and the bearing 34 permits the driving member 12 to rotate without driving the driven member 36 unless the clutch mechanism is engaged. When the aforementioned temperature and/or pressure sensors (not shown) sense an engine operating condition in which operation of the engine cooling fan is required, an electrical signal is transmitted through the connecting wire 20 and 22 to energize the coil comprising the windings 32. When this occurs, magnetic flux created in the magnetic circuit defined by the pole piece portions 26, 28 and the band 52 causes the band to move radially, viewing FIG. 1, in a direction toward the pole pieces 26, 28. Consequently, the band 52 will be brought into engagement with the outer edges 46, 48 and the projections 60, 62 which are carried by the pole piece portions 26, 28, to thereby maintain the clutch in engagement to cause the driving member 12 to rotate the driven member 36. Accordingly, a driving connection is provided causing the fan blade 40 to rotate with the driving member 12. When the clutch is to be disengaged, and the current in the windings 32 is turned off, permitting the band 52 to separate from the pole piece portions 26, 28 thereby breaking the driving connection between the driving member 12 and the driven member 36.

I claim:

1. In a clutch, a pair of coaxial, relatively rotatable members comprising a driving member and a driven member, a band for drivingly interconnecting said members when the clutch is engaged, means for drivingly engaging one end of the band with one of said members, the other member carrying a spool, said spool comprising a pair of circumferentially extending, axial offset pole piece portions cooperating with said band to define a magnetic circuit, said pole piece portions having uninterrupted, circumferentially extending edges facing said band for engagement thereby when the clutch is engaged, means carried by said spool for generating magnetic flux for forcing said band into driving engagement with said edges, said edges having axially projecting portions cooperating with one another to define a segmented gap therebetween, said projecting portions having an outer surface facing said band for engagement by the latter when the clutch is engaged, said edges and said outer surfaces being disposed in a common circumferential plane.

2. The invention of claim 1 wherein:
each of said axially projecting portions alternates with a corresponding axially projecting portion projecting from the other of said edges, adjacent axially projecting portions on each of said edges cooperating with one another to define a space therebetween, said space receiving a corresponding axially projecting portion projecting from the opposite one of said edges.

3. The invention of claim 2 wherein:
each of said axially projecting portions taper radially as they project from their corresponding axially spaced edges, whereby the thickness of said axially projecting portions is greater at their juncture with their corresponding edge.

4. The invention of claim 1 wherein:
said gap includes first segments extending oblique with respect to the edges of the pole piece portions from one of said pole piece portions toward the other of said pole piece portions, and second segments extending at an angle with respect to said first segments.

5. The invention of claim 4, wherein:
said axially projecting portions include axially tapering sections cooperating with axially tapering sections of adjacent axially projecting portions to define said segments of said gap.

6. The invention of claim 1, wherein:
said gap includes segments extending obliquely with respect to the circumferentially extending edges of said pole piece portions.

7. The invention of claim 6, wherein:
adjacent projecting portions extending from each of said edges define a gap receiving a projecting portion from the opposite edge, said adjacent projecting portion being interconnected by a segment of the corresponding edge closing the gap between the adjacent projecting portions, said edge segment lying in the common circumferential plane defined by the outer surface of the projecting portions and the remainder of said edges.

* * * * *